United States Patent [19]

Knyazkin et al.

[11] Patent Number: 5,049,023
[45] Date of Patent: Sep. 17, 1991

[54] MECHANIZED MULTITIER STORAGE APPARATUS

[76] Inventors: Jury V. Knyazkin, ulitsa Palikha, 7/9, korpus 3,kv.14; Anatoly F. Smyk, Kashirskoe shosse, 92, korpus 3, kv.413, both of Moscow, U.S.S.R.

[21] Appl. No.: 459,737
[22] PCT Filed: Jun. 27, 1989
[86] PCT No.: PCT/SU89/00178
  § 371 Date: Feb. 27, 1990
  § 102(e) Date: Feb. 27, 1990
[87] PCT Pub. No.: WO90/00145
  PCT Pub. Date: Jan. 11, 1990

[30] Foreign Application Priority Data

Jun. 28, 1988 [SU] U.S.S.R. .............................. 4446403

[51] Int. Cl.⁵ .............................................. B65G 1/04
[52] U.S. Cl. .................................... 414/280; 414/416
[58] Field of Search ............... 414/331, 280, 416, 660, 414/661, 226, 222

[56] References Cited

U.S. PATENT DOCUMENTS

| 3,063,769 | 11/1962 | Graber et al. | 312/223 |
|---|---|---|---|
| 3,700,121 | 10/1972 | McManus | 414/331 |
| 4,655,676 | 4/1987 | Jamborg et al. | 414/226 X |
| 4,801,236 | 1/1989 | Katzenschwanz | 414/416 |
| 4,832,203 | 5/1989 | Nozawa | 414/280 X |
| 4,878,799 | 11/1989 | Seto et al. | 414/331 |

FOREIGN PATENT DOCUMENTS

| 92504 | 4/1988 | Japan | 414/280 |
|---|---|---|---|
| 695901 | 11/1979 | U.S.S.R. | |
| 1175810 | 8/1985 | U.S.S.R. | 414/280 |
| 1359222 | 12/1987 | U.S.S.R. | |
| 2112365 | 7/1983 | United Kingdom | |
| 2124941 | 2/1984 | United Kingdom | |

Primary Examiner—David A. Bucci
Attorney, Agent, or Firm—Fleit, Jacobson, Cohn, Price, Holman & Stern

[57] ABSTRACT

A mechanized multitier storage apparatus includes a housing, main load-carrying brackets located in the housing and installed vertically in pairs, removable shelves installed on the main load-carrying brackets, and at least two carriages connected with a drive providing vertical movement. Each carriage is provided with a pull-out shelf-engaging element. Additionally, the storage apparatus is provided with an industrial robot having a gripper movably installed on a horizontal guide mounted on a side of the housing opposite to the direction in which the shelf-engaging element is pulled out, and a pair of additional brackets located in line with the main load-carrying brackets. The housing provided with a side opening for the gripper of the industrial robot.

2 Claims, 9 Drawing Sheets

MECHANIZED MULTITIER STORAGE APPARATUS

TECHNICAL FIELD

The invention relates generally to the field of mechanical engineering, and more particularly, to a mechanized multitier storage apparatus.

BACKGROUND OF THE INVENTION

Known in the art is a mechanized multitier storage apparatus (See, e.g., U.S. Pat. No. 3,063,769), comprising a housing, load-carrying brackets located therein, removable shelves installed on the brackets, and a carriage connected with a drive producing vertical movement and provided with shelf-engaging means.

This known storage apparatus operates as follows.

The vertical movement drive entrains the carriage up to the level of the selected removable shelf which, by means of the shelf-engaging means, moves from the load-carrying brackets onto the carriage. Then, the carriage, with the shelf, is moved by the drive to a loading and unloading position. Upon completing the process of loading or unloading, the shelf is returned by the carriage and shelf-engaging means onto the load-carrying brackets, i.e., to the previous location.

The known mechanized multitier storage apparatus has a cumbersome structure and occupies a relatively large area, since its carriage is located in front of the removable shelves. This increases the width of the storage apparatus at least twofold. Additionally, the storage apparatus has limited technological and functional potentialities, inasmuch as it serves only for storage of the load.

Known in the art is a mechanized multitier storage apparatus, (See, e.g., U.S.S.R. Publication 695,901), comprising a housing with load-carrying brackets, removable shelves installed on load-carrying brackets, and carriages connected with a drive for vertical movement. The carriages are arranged, one per lateral side of removable shelves, along the width thereof. Each of the carriages is provided with a pull-out shelf-engaging means.

Operation of the storage apparatus is similar to the operation of the initially described apparatus one, except that the carriages move vertically from the lateral sides of the shelves, and the shelf-engaging means shift the selected shelf outside the housing.

However, the storage apparatus has limited technological and functional potentials, since it cannot be used in combination with other production equipment requiring simultaneous loading/unloading of the storage apparatus with pallets with unit loads placed thereon and piecewise delivery and return of the load onto the pallets installed on the shelves.

Thus, for example, employment of the storage apparatus in combination with an N/C machine tool and an industrial robot for piecewise feeding of the workpiece to the machine tool allows only consecutive operation of the machine tool and the storage apparatus, because, during operation of the machine tool, the storage apparatus cannot function, since it retains one of the shelves in the pulled out position to ensure a possibility of piecewise feeding the workpiece to the machine tool by means of the robot. Moreover, when the storage apparatus operates during its loading/unloading with pallets, the machine tool and the robot must be stopped, which considerably lowers productivity.

SUMMARY OF THE INVENTION

The main object of the present invention is to provide a mechanized multitier storage apparatus, with a design which ensures expanding of its technological and functional potentialities for employment of the storage apparatus, in combination with production equipment of automated lines.

The object of the invention is accomplished by providing a mechanized multitier storage apparatus comprising a housing with the main load-carrying brackets located therein and installed vertically in pairs, removable shelves installed on the main load-carrying brackets, and at least two carriages connected with a drive for their vertical movement, arranged one per lateral side of the removable shelves along the width thereof, each carriage being provided with a pull-out shelf-engaging means for interaction with the removable shelves and ensuring their horizontal movement outside the housing. According the invention, the apparatus is provided with an industrial robot having a gripper, movably installed on the horizontal guide mounted on the housing side which is opposite to the direction of pulling out the shelf-engaging means, and with a pair of additional brackets free from the removable shelf and located in one line with the main load-carrying brackets, the housing being made with an opening on said side for introducing the gripper of the industrial robot and placing it above one of the removable shelves installed on the pair of additional brackets.

It is also expedient that the pair of additional brackets of the mechanized multitier storage apparatus be located in the housing under the main load-carrying brackets.

As it is described above, the embodiment of the mechanized multitier storage apparatus renders it possible to use it as part of the production equipment of automated lines, which will raise productivity of production equipment, release production areas owing to the compactness of construction, and improve the labor conditions of the attending personnel.

BRIEF DESCRIPTION OF THE DRAWINGS

The invention will now be described in detail with reference to the accompanying drawings illustrating a specific embodiment thereof, in which.

DETAILED DESCRIPTION OF THE PREFERRED EMBODIMENTS

Figure 1:
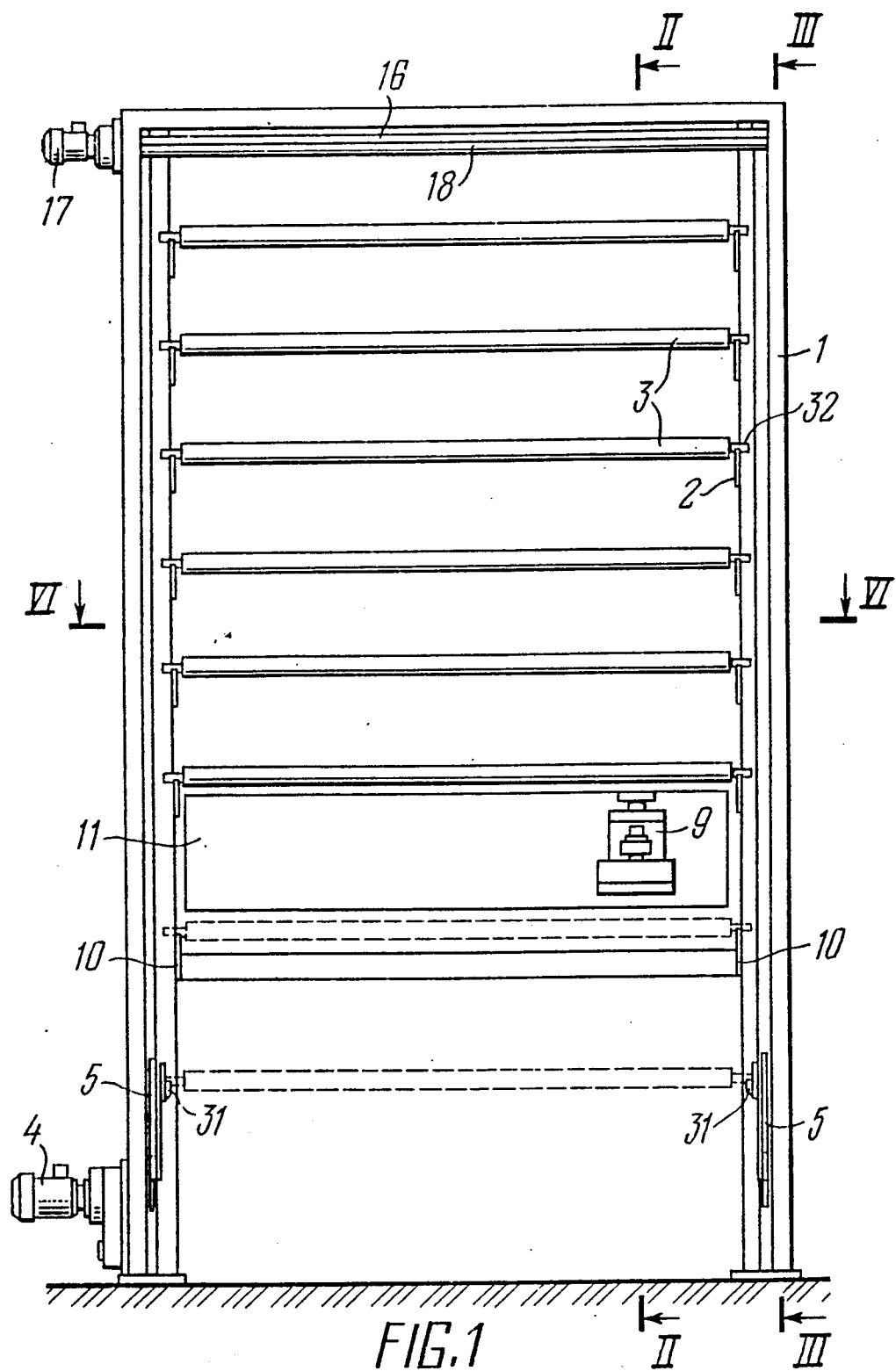
FIG. 1 is a general front view of the mechanized multitier storage apparatus, according to the invention.
Figure 2:
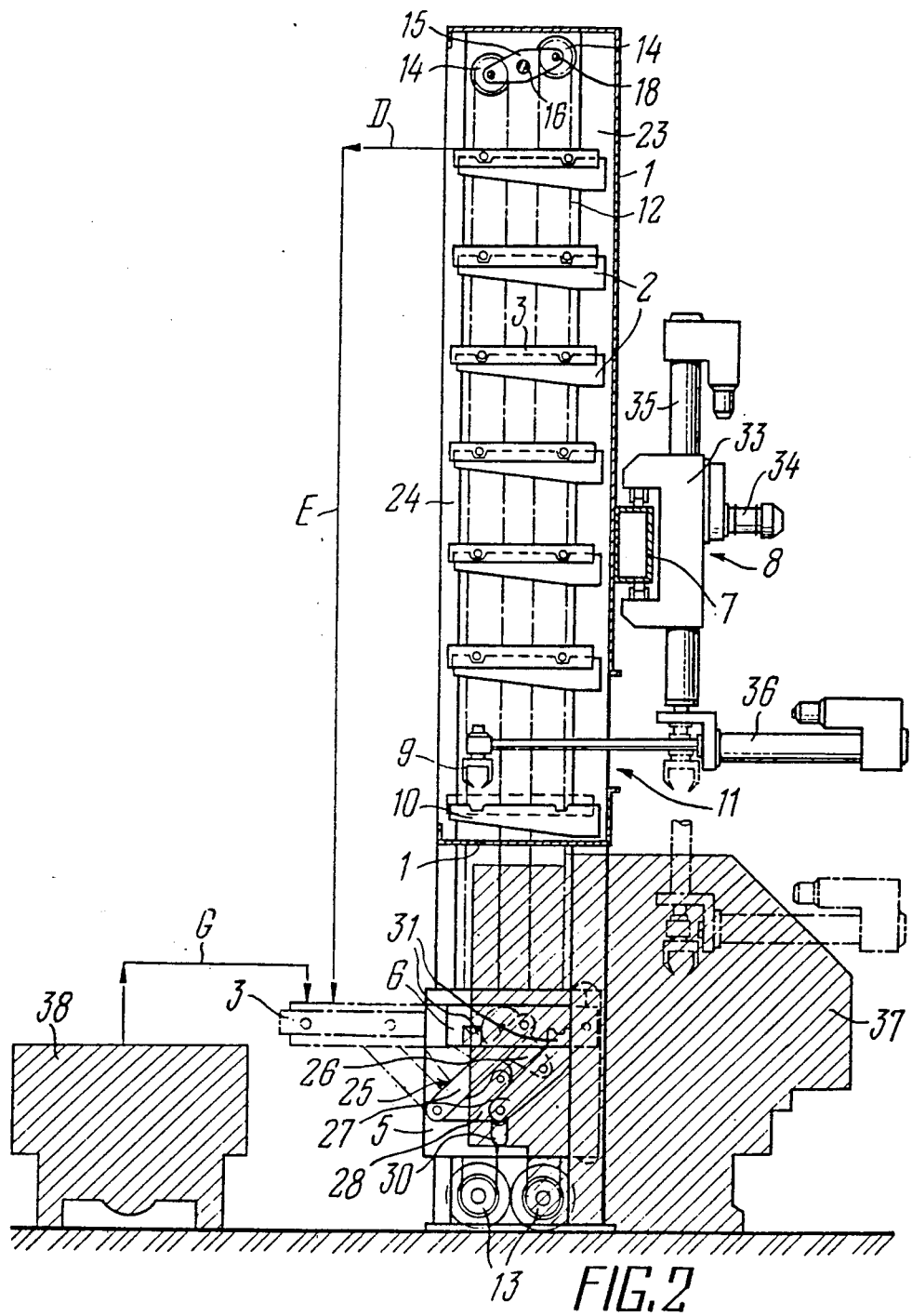
FIG. 2 is a view of the apparatus of FIG. 1, showing a section taken along the line II—II of FIG. 1.

The mechanized multitier storage apparatus comprises a housing 1 (FIG. 1) installed in which vertically in pairs are main load-carrying brackets 2. The main load-carrying brackets 2 carry removable shelves 3. Additionally, located in the housing are two carriages 5 connected with a vertical movement drive 4 by means of an electric drive, for example. The carriages 5 are arranged, one per lateral side of the removable shelves 3, along the width thereof, each carriage being provided with a pull-out shelf-engaging means 6 (FIG. 2) for interaction with lateral sides of the removable shelves 3 and to ensure their horizontal movement outside the housing 1. A horizontal guide 7 is mounted on the side of housing 1, which is opposite to the direction of pulling out of the shelf-engaging means 6. The guide movably mounts an industrial robot 8 (of prior art design), which has a gripper 9.

Besides, the housing 1 is provided with a pair of additional brackets 10, free from the shelf 3, made identical with the main load-carrying brackets 2 and arranged vertically in one line under the main load-carrying brackets 2.

From the side of location of the robot 8, the housing 1 is made with an opening 11 to receive the gripper 9 and position it above one of the removable shelves 3 mounted on the pair of additional brackets 10.

Figure 3:
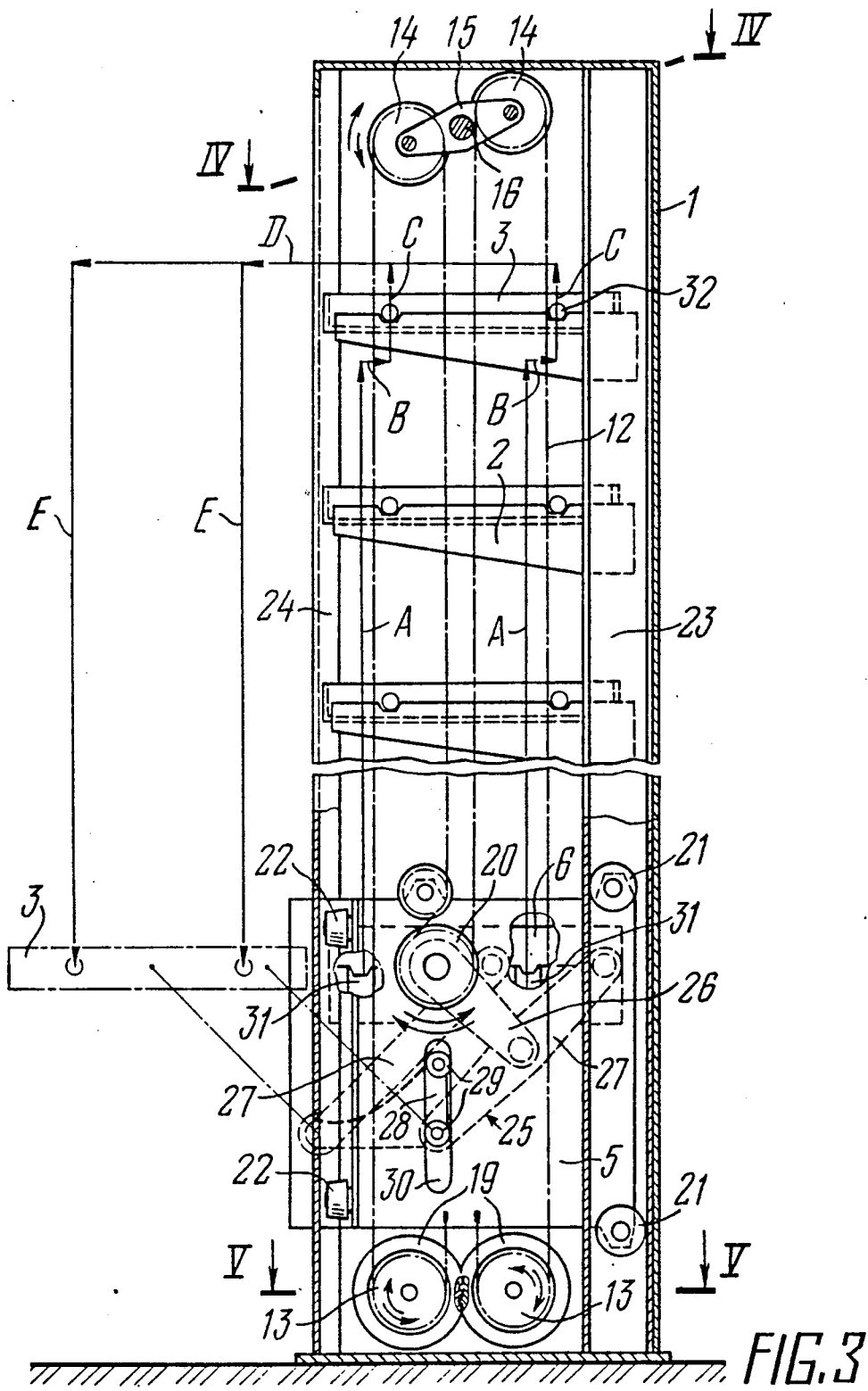
FIG. 3 is a view of the apparatus of FIG. 1, showing a section taken along the line III—III of FIG. 1.
Figure 4:
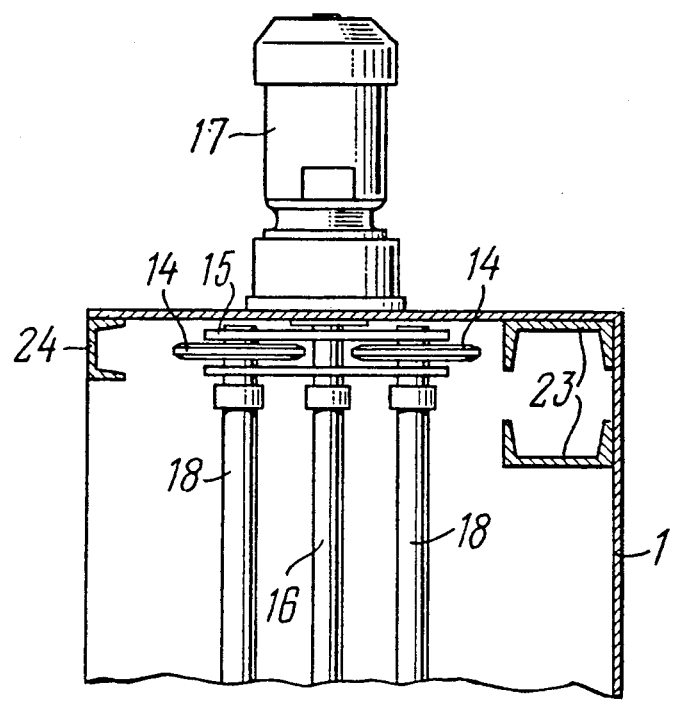
FIG. 4 is a section taken along the line IV—IV of FIG. 3.

Attached to each carriage 5 are the ends of a chain 12 (FIG. 3), enveloping sprockets 13 mounted in the lower part of the housing 1, and swinging sprockets 14 mounted in the upper part of the housing 1 on a rocker 15. Rockers 15, on both sides of the stocker are rigidly fixed on a common shaft 16 connected with an electric drive 17 (FIG. 4), whereas sprockets 14 on the opposite lateral sides of the housing 1 are interconnected by shafts 18.

Figure 5:
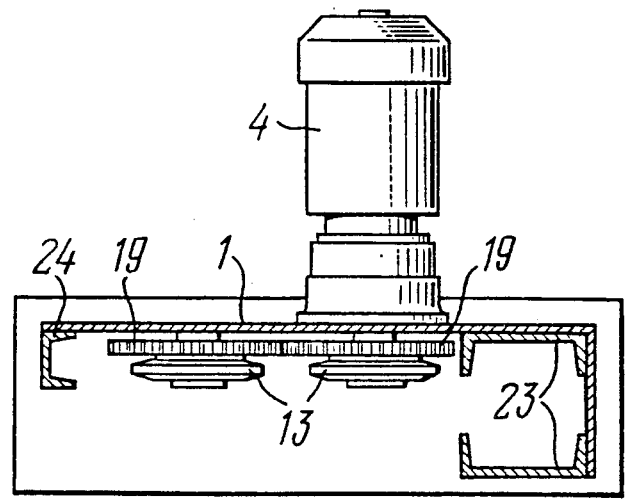
FIG. 5 is a section taken along the line V—V of FIG. 3.
Figure 6:
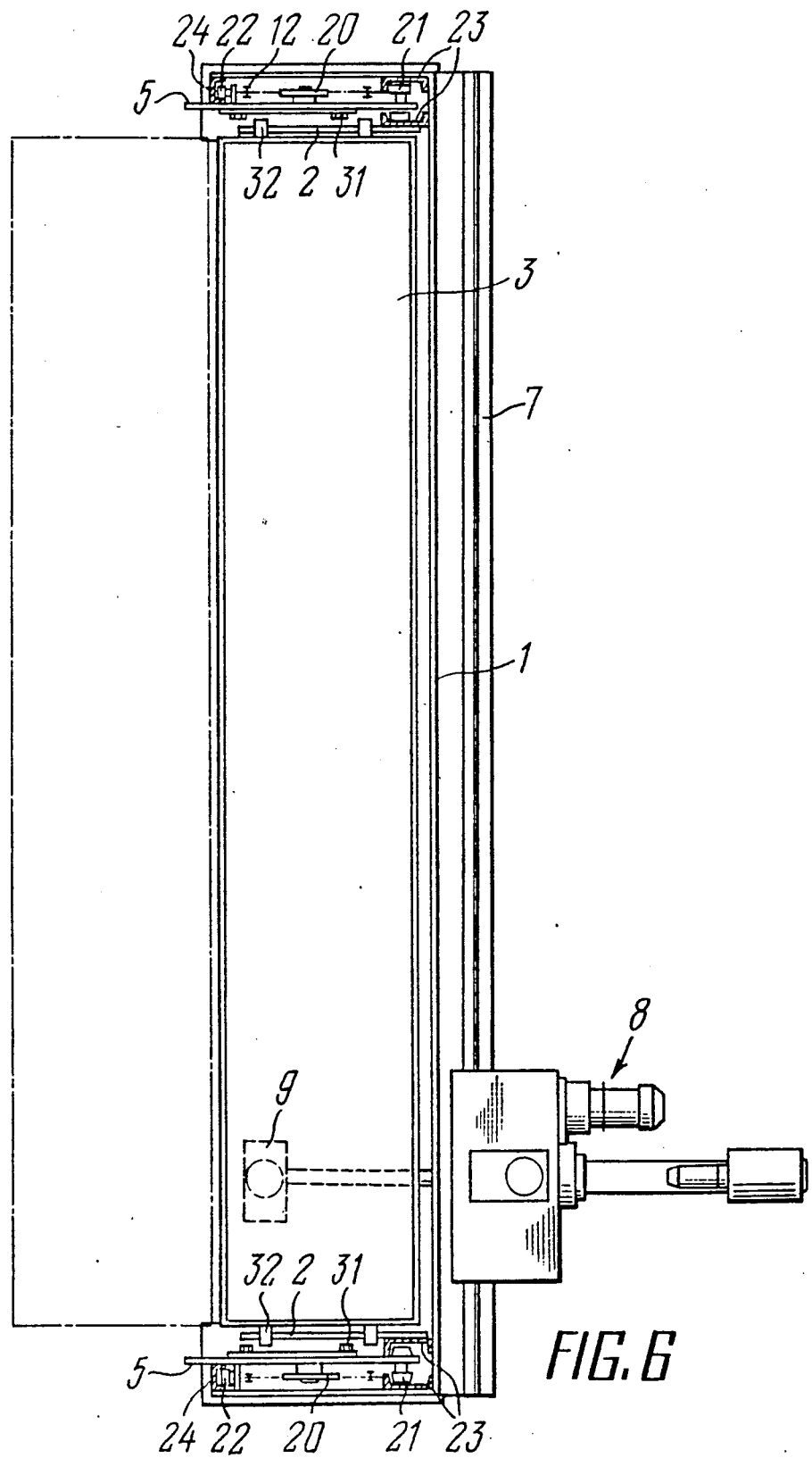
FIG. 6 is a view of the mechanized multitier storage apparatus, showing a section taken along the line VI—VI of FIG. 1.

The sprockets 13 (FIG. 3) on one lateral side of the housing 1 are connected with the drive 4 (FIG. 1) through gears 19. Each chain 12 (FIG. 3) forms a loop which envelops a sprocket 20 installed on the respective carriage 5. Each carriage 5 is provided with rollers 21, 22 intended for movement along vertical guides 23, 24 (FIGS. 5,6) respectively, fixed in the housing 1.

Each sprocket 20 is connected through a link-and-lever gear 25 (FIGS. 2,3) with a respective pull-out shelf-engaging means 6 of a respective carriage 5. Each link-and-lever gear 25 comprises a rocking lever 26, parallel levers 27 and a slide 28. The rocking lever 26 is rigidly fixed on the axle of the sprocket 20 and hinge-jointed with one of the parallel levers 27. The levers 27 are hinged-jointed with the shelf-engaging means 6 and slide 28. The slide 28 is fitted with rollers 29 movably arranged in a vertical slot 30 of the carriage 5.

Each shelf-engaging means 6 has supports 31 with recesses for journals 32 of the removable shelves 3 intended for resting on the main load-carrying brackets 2 and additional brackets 10.

Figure 7:
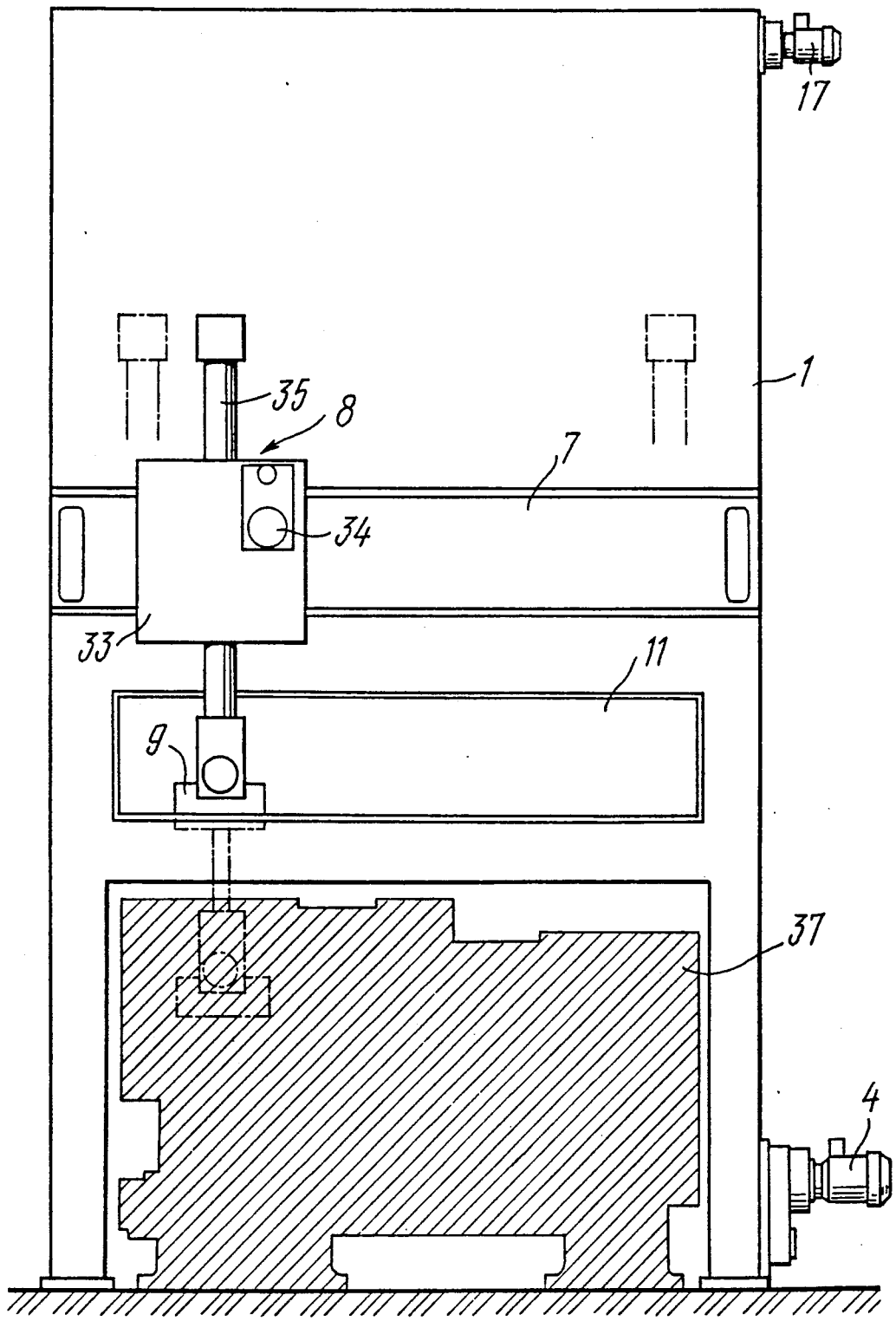
FIG. 7 is a view of the apparatus shown in FIG. 1, showing a rear view thereof.
Figure 8:
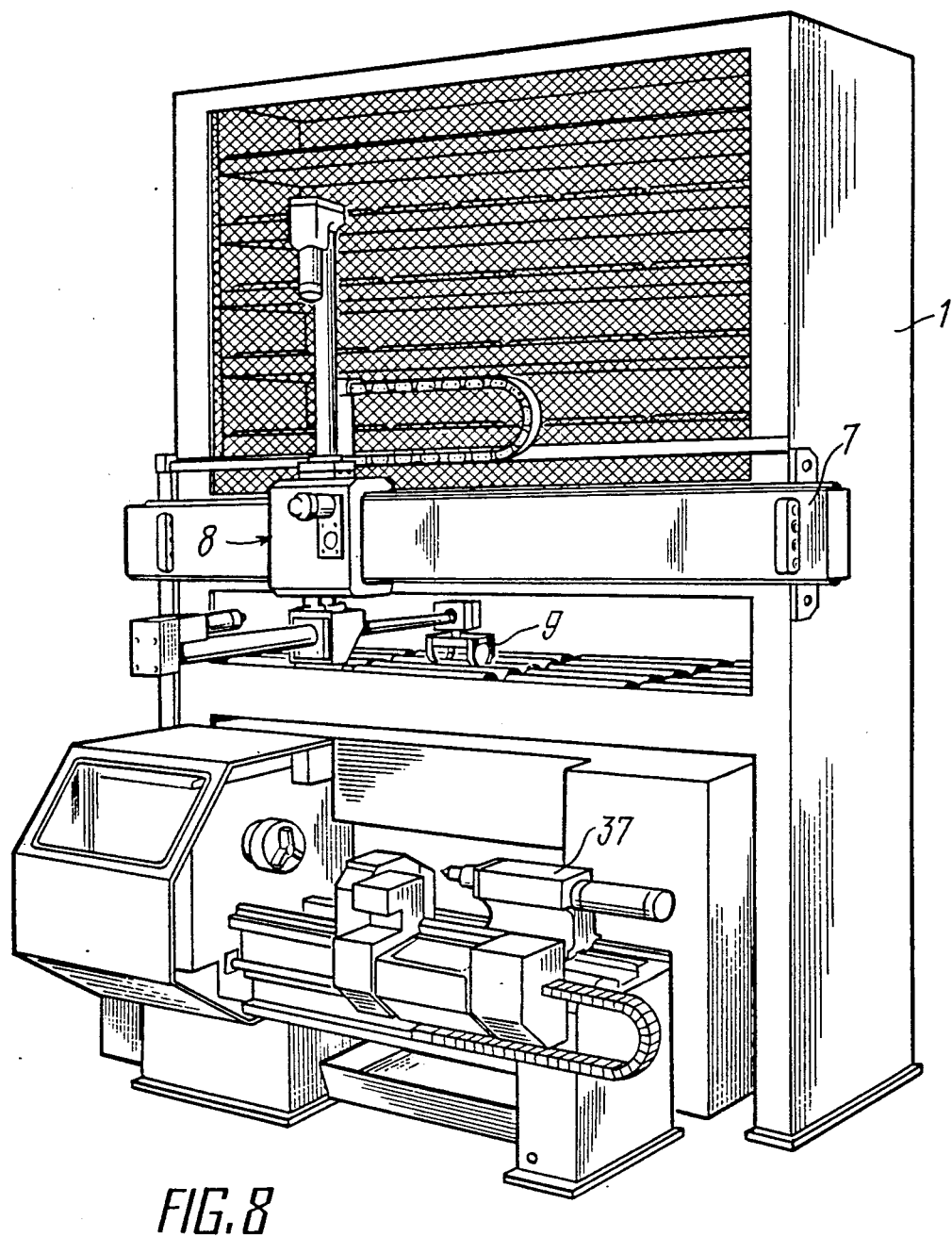
FIG. 8 is a view of a mechanized multitier storage apparatus in combination with a N/C lathe.

The robot 8, movably mounted on the horizontal guide 7, has a body 33 (FIGS. 2,7) fitted with an electric drive 34. The body 33 is provided with a hydraulic cylinder 35 for the vertical movement of the gripper 9 of the robot 8, and a hydraulic cylinder 36 for the horizontal movement of the gripper 9. The gripper 9 is actuated by a hydraulic system (not shown).

The mechanized multitier storage apparatus is automatically controlled by means of an electric circuit and limit switches (not shown in the drawings).

The mechanized multitier storage apparatus operates as follows.

In the initial state of the storage apparatus, the carriages 5 (FIGS. 1-3) occupy the extreme lower position, and the supports 31 of the shelf-engaging means 6 are somewhat displaced horizontally relative to the journal 32 of removable shelves, and the additional load-carrying brackets 10 are free.

Upon being switched on, the electric drive 4, through the gears 19, rotates the sprockets 13 in the opposite directions. In this case, the external runs of chains 12 move down with the same speed, while their internal runs move upwards with the same speed, also, entraining the carriages 5 (as shown by the arrow A) by means of the loops enveloping the sprockets 20.

The electric drive 4 stops in the area of the preselected shelf 3, the uppermost one, for example, somewhat below its journal 32, and then the electric drive 17 (FIG. 4) is energized. Rockers 15 start turning counterclockwise in this case and, together with the rockers, the axles of swinging sprockets 14 (FIG. 3) start movement in the opposite directions. This causes pulling of the internal runs of the chains 12 also in the opposite directions which, in its turn, causes turning of the sprockets 20 in the counterclockwise direction. Turning of the sprockets 20 through the link-and-lever gear 25 causes a certain horizontal movement (as shown by arrow B) of the shelf-engaging means 6 to a position of the arrangement of the supports 31 immediately under the journals 32 of the uppermost shelf 3.

Further on, the electric drive 4 (FIGS. 1-3) is switched on again and the carriages 5, moving upwards (as shown by arrow C), catch up the removable shelf 3 by the journals 32 by means of supports 31 of the means 6. When the journals 32 reach a position somewhat higher than the main load-carrying brackets 2, the electric drive 4 is deenergized, and the drive 17 (FIG. 4) is switched on again, now turning rockers 15 (FIGS. 2,3) clockwise. The sprockets 20 in this case, rotating clockwise, with the aid of the link-and-lever gear 25, pull out (as shown by arrow D) the means 6 together with the shelf 3 outside the housing 1.

The electric drive 17 (FIG. 4) is deenergized and instead the electric drive 4 (FIGS. 1-3) is energized for lowering (as shown by arrows E) the carriages 5 to their bottom position, where the extended and lowered removable shelf 3 is loaded with pallets (not shown in the drawings) carrying unit loads, for example, workpieces for the N/C lathe 37. The pallets, with workpieces, can be brought to the mechanized multitier storage apparatus by a transport vehicle 38. The transfer of pallets with workpieces from the transport vehicle 38 onto the shelf 3 is shown by the arrow G. The loaded shelf 3 is installed on the additional brackets 10 through carrying out the above-described operations in the reverse order.

After installing the loaded removable shelf 3 on the pair of additional brackets 10, the robot 8 is actuated (see FIGS. 2,6,7) and, according to a preset program, moves along the guide 7, and by means of its gripper 9, feeds the workpieces piecewise to the lathe 37 through an opening 11 and returns the finished parts to the pallets.

Simultaneously with the operation of the lathe 37 and of the robot 8, the removable shelves 3 remaining in the storage apparatus are loaded with pallets carrying workpieces by way of removing them from their main brackets 2, lowering them to the bottom position for loading, and returning them onto the main brackets 2.

After machining the workpieces taken from the removable shelf 3 positioned on the additional brackets 10, and during machining of the last workpiece taken from the shelf 3, the shelf is reinstalled in its former place in the storage apparatus, and the next removable shelf 3 loaded with workpieces is brought onto the additional brackets 10 to ensure contininous operation of the lathe 37.

Figure 9:
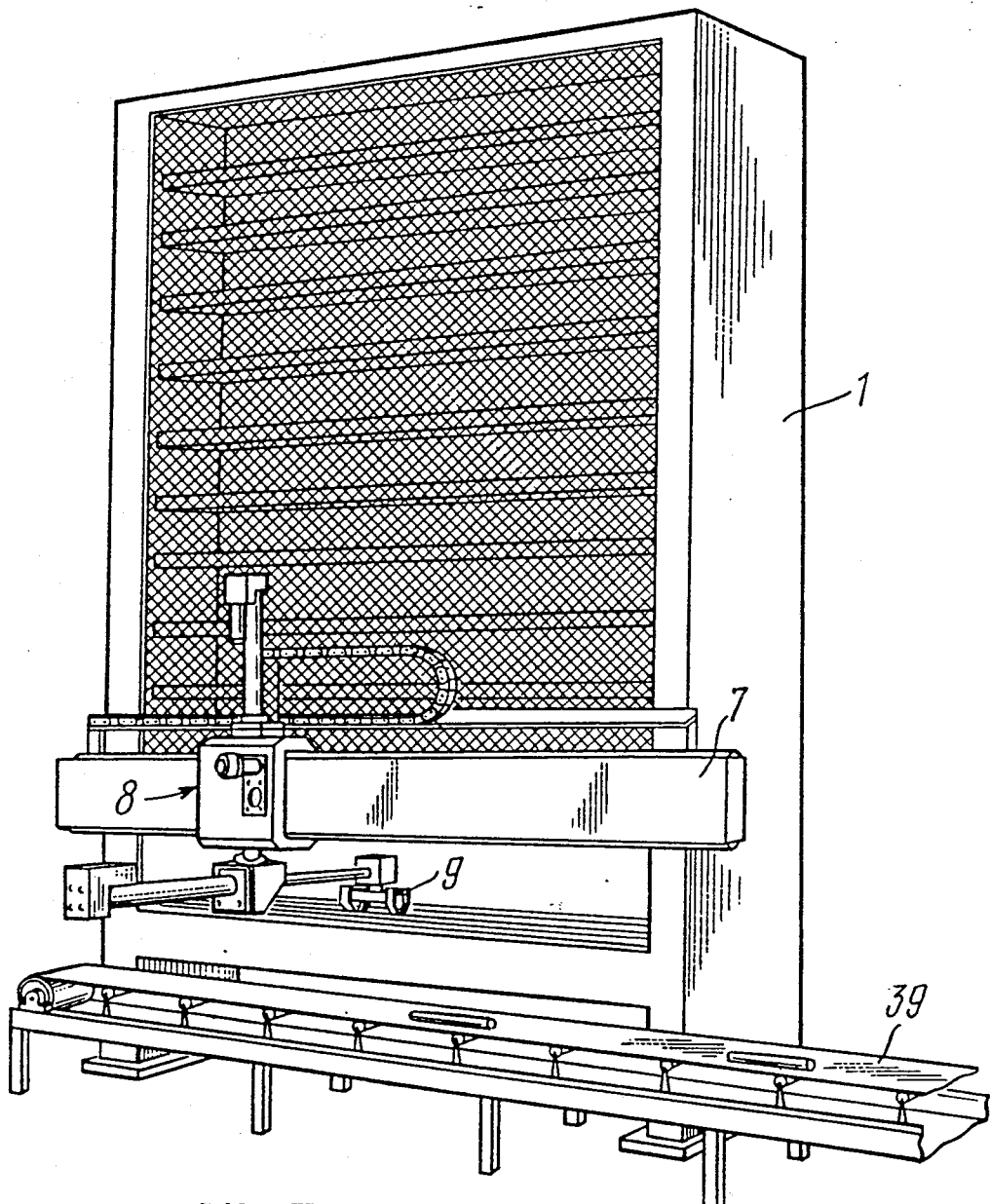
FIG. 9 is a view of a mechanized multitier storage apparatus in combination with a longitudinal conveyor.
Figure 10:
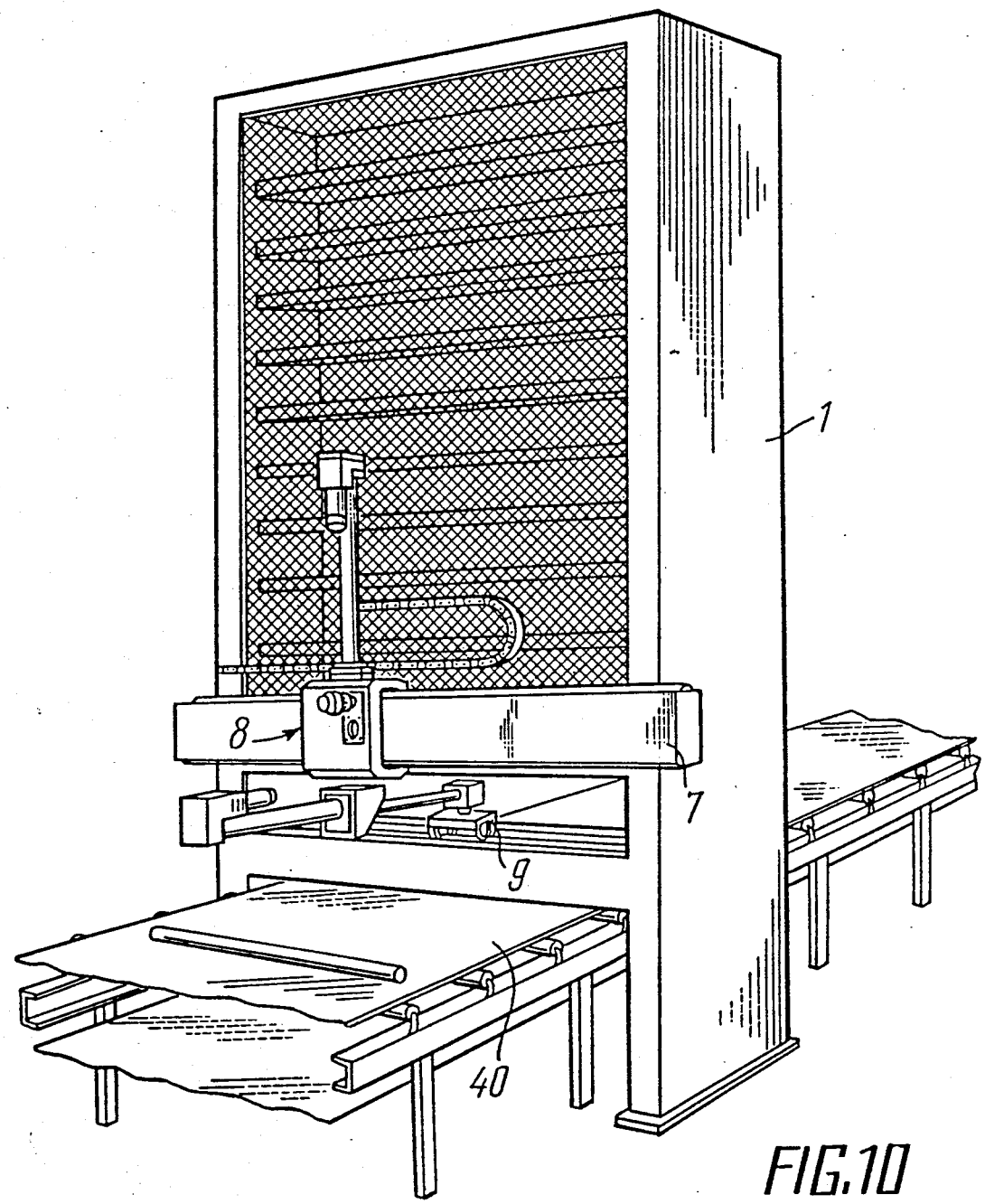
FIG. 10 is a view of a mechanized multitier storage apparatus in combination with a cross conveyor.

As the removable shelves 3 with finished parts are being storaged, simultaneously with the operation of the lathe or other production equipment, for example, a longitudinal conveyor 39 or a cross conveyor 40 (FIGS. 9-10), the shelves can be brought by the shelf-engaging means 6 (FIGS. 2,3) to the lower position for unloading, with a view to transfer the pallets with finished parts to other technological positions. In this case, the unloaded removable shelf 3 can again be loaded with pallets carrying workpieces or changeable tools and attachments for the lathe, which, at the further installation of this shelf on the additional brackets 10 in the zone of operation of the gripper 9 of the robot 8, can be fitted in the lathe instead of the worn out tools or for carrying out other operations for machining workpieces.

The claimed mechanized multitier storage apparatus allows for its loading/unloading with pallets carrying unit loads placed thereon, simultaneously delivering the load piecewise, and returning the load onto pallets. Employment of the claimed mechanized multitier storage apparatus in combination with production equipment in, for example, mechanical engineering will raise productivity of production equipment, release production areas owing to the compactness of construction, and improve the labor conditions of the attending personnel.

Thus, the mechanized multitier storage apparatus made as described above ensures broadening of its technological and functional potentials.

INDUSTRIAL APPLICABILITY

The invention can be used as a robotized complex of flexible production systems, as well as in production lines of engineering enterprises.

We claim:

1. A mechanized multitier storage apparatus, comprising:
   a housing with main load-carrying brackets installed vertically in pairs,
   removable shelves installed on the main load-carrying brackets,
   at least two carriages connected with a drive for producing vertical movement thereof, said carriages being arranged, one per lateral side of the removable shelves, along a width of said removable shelves, each carriage being provided with a pull-out shelf-engaging means for interaction with said removable shelves and for ensuring horizontal movement of said removable shelves outside the housing,
   an industrial robot having a gripper, movably installed on a horizontal guide mounted on the housing on a side opposite to a direction of pulling out of the pull-out shelf-engaging means, and
   a pair of additional brackets free from the removable shelves and arranged in line with the main load-carrying brackets, the housing, from said side opposite to the direction of pulling out of the pull-out shelf-engaging means, being provided with an opening to receive the gripper of the industrial robot and position it above one of the removable shelves installed on said pair of additional brackets.

2. A mechanized multitier storage apparatus according to claim 1, wherein said pair of additional brackets is located in the housing under the main load-carrying brackets.

* * * * *